No. 830,399. PATENTED SEPT. 4, 1906.
W. H. YOUNG.
BARBER'S POLE.
APPLICATION FILED DEC. 26, 1905.
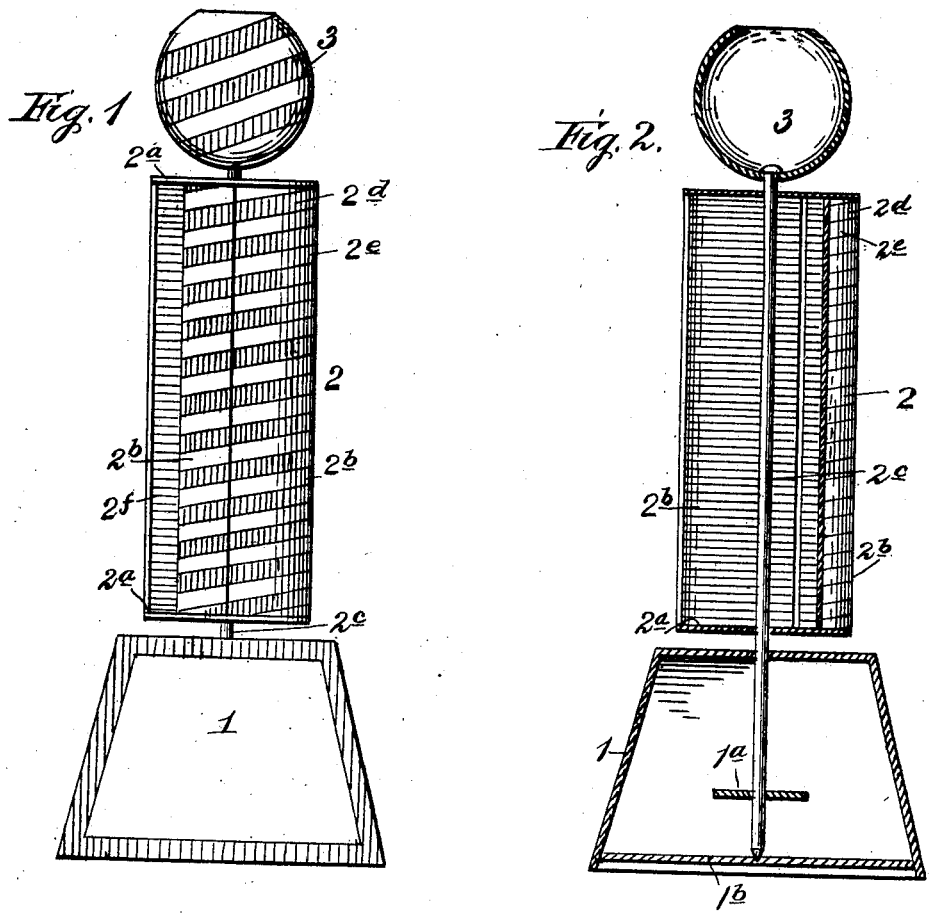
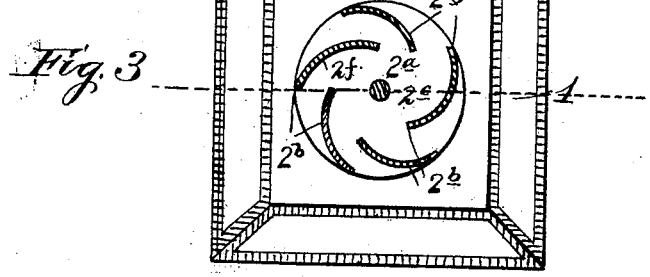
Witnesses:
Inventor:
Wm. H. Young,
By
Attorneys

UNITED STATES PATENT OFFICE.

WILLIAM H. YOUNG, OF BELOIT, KANSAS.

BARBER'S POLE.

No. 830,399.　　Specification of Letters Patent.　　Patented Sept. 4, 1906.

Application filed December 26, 1905. Serial No. 293,302.

*To all whom it may concern:*

Be it known that I, WILLIAM H. YOUNG, a citizen of the United States, residing at Beloit, in the county of Mitchell and State of Kansas, have invented certain new and useful Improvements in Barbers' Poles, of which the following is a specification.

My invention relates to improvements in what are known as "barbers' poles."

It has for its object more especially conspicuousness of display to get the attention of the public in a business way and to effect this end in a simple and effective manner.

Said invention consists of certain structural features substantially as hereinafter fully disclosed, and specifically pointed out by the claims.

In the accompanying drawings, illustrating the preferred embodiment of my invention, Figure 1 is an elevational view thereof. Fig. 2 is a vertical section, and Fig. 3 is a cross or horizontal section of the same.

In carrying out my invention I provide a suitable pedestal or base 1, and upon this latter is superposed or mounted the pole proper, 2, itself surmounted by an ornamental member or globe 3, which in the present instance is hollow and having an opening through its upper surface or shell, the design of which will be later noted.

The pole 2 is constituted principally of two heads, disks, or circular pieces $2^a$ and a number or plurality of longitudinal or vertical wings or blades $2^b$, fixed at their ends to and between said heads and which will be again further referred to hereinafter. Centrally extending through the pole and fixed to said heads is a vertical rod $2^c$ with its upper projecting end effective for the attachment thereto of the globe or ornament before noted and its lower projecting end portion adapted to provide for pivoting or poising the pole in position. Said projecting lower end portion of the rod $2^c$ is initially passed or inserted through an opening in the top surface of the base or pedestal 1, again through an aperture in a cross-piece $1^a$, and finally caused to rest or bear at its lower previously-tapered end upon a bottom cross-piece $1^b$ of the pedestal. Both of these cross-pieces are suitably fixed within the base or pedestal to its sides, one being slightly spaced off from and arranged at right angles to the other, as disclosed in Fig. 2, the purpose of which is obvious.

The blades or wings $2^b$ are arcuate in cross-sectional outline and arranged chute-like to provide for readily receiving the action of the wind or air-currents thereon primarily to cause the turning of the post to call the attention of the public to the place of business advertised thereby. The outer surfaces of the blades or wings $2^b$, as also that of the globe 3, have suitably painted thereon red and white stripes $2^d$ $2^e$, while the entire inner surfaces of said wings or blades are painted blue, as at $2^b$, representing additional stripes, which inner blue surfaces or stripes stand well outward from the adjoining outer red and white stripes or surfaces, thus conjointly being suggestive of the ordinary barber's pole stripes, as will be appreciated. These wings or blades suitably terminate or are removed at their inner longitudinal or vertical edges one from the other to permit the wind or air-currents to pass by the same practically unobstructed through the pole as necessary to prevent inducing a reactionary force and to provide for the continuous turning of the latter when subjected to air-current or wind action.

I claim—

A device of the character described, comprising a pole proper, constituted of upper and lower heads and intermediary longitudinal or vertical wings or blades angularly fixed to said heads and having their inner surfaces standing out clearly to view, said pole being equipped with means for poising or pivoting the pole in position, and said blades or wings having their outer and inner surfaces painted in different colors, conjointly suggestive of the purposes of the pole.

In testimony whereof I affix my signature in presence of two witnesses.

WILLIAM H. YOUNG.

Witnesses:
　G. W. FISHER,
　F. M. CREACH.